United States Patent [19]

Lewiner et al.

[11] 4,355,235
[45] Oct. 19, 1982

[54] DEVICES FOR MEASURING PARAMETERS WHICH CAN MODIFY THE CHARGE OF AN ELECTRET

[76] Inventors: Jacques Lewiner, 5, rue Bory d'Arnex, 92210 Saint-Cloud; Gerard Dreyfus, Rue du Viaduc - Villebon s/Yvette, 91120 Palaiseau; Didier Perino, 10, rue de Bellevue, 92150 Suresnes, all of France

[21] Appl. No.: 142,737

[22] Filed: Apr. 22, 1980

[30] Foreign Application Priority Data

Apr. 23, 1979 [FR] France ................................ 79 10225
Feb. 11, 1980 [FR] France ................................ 80 02967
Feb. 11, 1980 [FR] France ................................ 80 02968

[51] Int. Cl.³ .............................................. G01T 1/18
[52] U.S. Cl. ................................... 250/376; 250/388
[58] Field of Search ............... 250/376, 377, 378, 375, 250/388, 389

[56] References Cited

U.S. PATENT DOCUMENTS

| | | | |
|---|---|---|---|
| 2,668,245 | 2/1954 | Rich | 250/377 |
| 2,753,463 | 7/1956 | Stout et al. | 250/378 |
| 2,967,243 | 1/1961 | Weller | 250/389 |
| 3,436,542 | 4/1969 | Ganouna-Cohen | 250/376 |
| 4,207,471 | 6/1980 | Coover | 250/378 |
| 4,227,086 | 10/1980 | Dreyfus et al. | 250/389 |

Primary Examiner—Davis L. Willis
Attorney, Agent, or Firm—Larson and Taylor

[57] ABSTRACT

The invention relates to a device for measuring irradiation capable of modifying the charge of an electret. It is arranged in a portable cassette, between two electrodes held separated by a part and connected to a measuring circuit. A conductive shutter is movable parallel to itself and to the electret between this electret and than electrode, so as to alternately mask this electret with respect to this electrode and to render the electret visible to the electrode. The measurement exploits differences in charge of the electret read according to the movements of the shutter.

28 Claims, 8 Drawing Figures

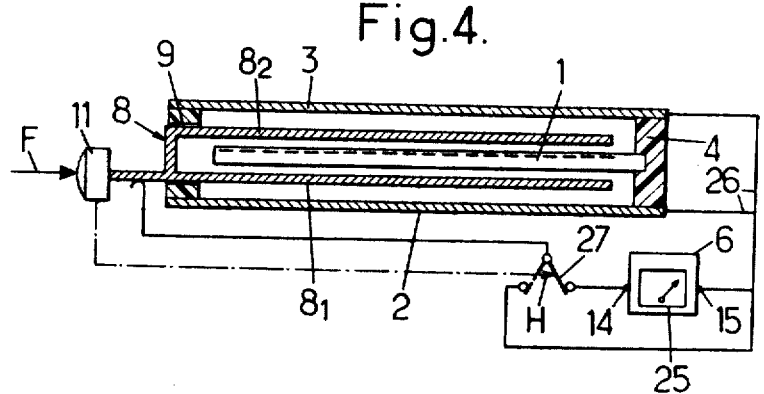
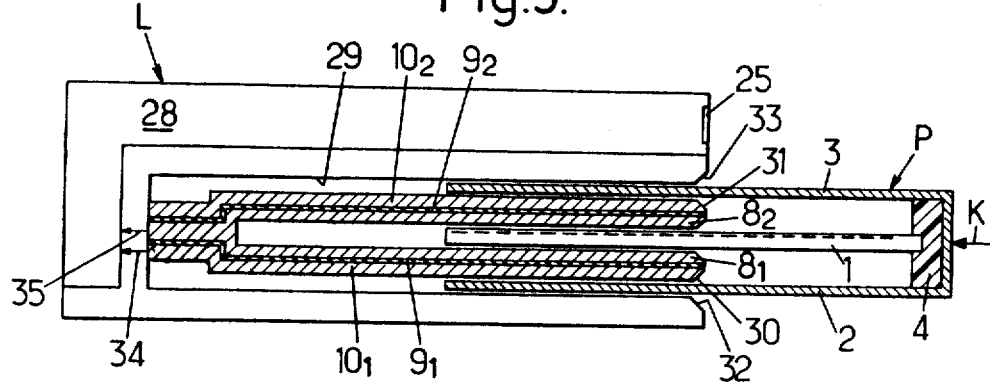

DEVICES FOR MEASURING PARAMETERS WHICH CAN MODIFY THE CHARGE OF AN ELECTRET

BACKGROUND OF THE INVENTION

1. Field of the Invention

The invention relates to devices for measuring a parameter capable of modifying an electrical charge borne by an electret. Such a parameter may be one of the following:

an ionizing radiation (gamma rays, x-rays, neutrons) capable of gradually discharging the electret, or of creating ions in the vicinity of this electret and thus of covering it gradually with an ion layer neutralising its charge, the concentration of a fluid, such as an organic vapor or liquid, adapted to gradually discharge the electret on being placed in contact with the latter, a temperature.

2. Description of the Prior Art

The invention relates more particularly, among these devices, to those including, in addition to the electret, two conductive electrodes framing this electret parallel to the latter, a separating part keeping at least one of these electrodes at a certain distance from the electret so as to reserve a chamber between them, means to enable the parameter to be measured to exert its influence in this chamber thereby modifying the charge of the electret, an electrical circuit for measuring the modifications in the electrical field produced in the chamber, a conductive flap or shutter and means for moving this shutter inside the chamber parallel to itself and to the electrodes from a watching or stand-by position to a measuring position and conversely.

It is a particular object of the invention to render measuring devices of the type concerned such that they respond to the various exigencies of practice better than hitherto, notably in that they are accurate, simple, effective, and portable, at least as regards the chamber of the electret, and inexpensive to manufacture and to use.

GENERAL DESCRIPTION OF THE INVENTION

The invention is essentially characterised in that measuring devices of the aforementioned type include means for elaborating, on each movement of the shutter bringing it into its measuring position, information representing a difference between two electret charges, which difference is linked with the measurement to be effected.

In preferred embodiments, recourse is also had to one and/or the other of the following features:

the difference in charge of the electret is the discharge undergone by the electret from a preceding moment corresponding notably to an identical previous movement of the shutter, the difference in charge of the electret is that observed at the moment of the measurement between the charges of two distinct areas, of the electret, arranged so as to be influenced differently by the parameter to be measured, in a measuring device according to the preceding paragraph, the surface area of the shutter is less than that of the electret, being preferably of the order of one half of that of the electret, and its displacement means enable it to be arranged transversely opposite, successively, two complementary areas of the electret, in a measuring device according to the paragraph before the last, one of the two electrodes or the shutter is divided in two portions extending respectively along two areas of the electret and the measurement information exploits the difference between the variations in charge induced on each of said portions by the movement of the shutter, the separating part is constituted of a material having the same coefficient of thermal expansion as the electret, the measuring device comprises, in addition, an electrical switch actuated automatically by the movements of the shutter and adapted to establish and interrupt the watching and measuring connection, the shutter and the electrodes are constituted by plates or coatings of aluminium, the conductive shutter is double, that is to say comprises two parallel conductive plates adapted to straddle the electret for one of the end positions of the shutter, each of these plates then extending between the electret and an electrode, in a measuring device according to the preceding paragraph, the two plates of the double shutter are covered externally by insulating layers, themselves covered externally by conductive layers connected preferably to the common potential of the two electrodes, the conductive shutter is of rotary type and divided into 2n identical circular sectors each extending over an angle of 180°/n around the axis of the shutter, n being a whole number at least equal to 1 and preferably less than 4, which sectors are alternately opaque and transparent with respect to the electrical field, the electrode arranged on the same side of the electret as the shutter is itself composed of n circular sectors identical with the preceding ones, staggered angularly from one another by 180°/n around the axis of the shutter, and an electric motor is provided which is light and consumes little energy to rotate said shutter constantly during measurements so that, in the course of each of its revolutions, this shutter ensures at least one complete cycle of the sequence of maskings and eliminations of masking which is its role of ensuring alternately between the electret and the electrode above, in a measuring device according to the preceding paragraph, the motor is a pulsed stepping motor of the type known in the field of clockmaking and is associated with a reducing mechanism, notably with gearing, a measuring device according to any one of the two preceding paragraphs comprises means for elaborating, on each revolution of the shutter, at least one information relating to the actual angular position of this shutter with respect to the electret and to exploit this information in the measuring circuit for synchronising purposes, measuring device according to any one of the two preceding paragraphs comprises means for setting permanently information relating to the overall discharge undergone by the electret from a given initial moment and/or to trigger a warning, notably a flashing visual warning, as soon as the value of said information exceeds a predetermined threshold, the components of the measuring device are borne by two distinct assemblies, namely on the one hand the electret, the two electrodes and the separating part, by a portable cassette, and on the other hand, the measuring circuit and preferably the shutter, by an apparatus, possibly fixed, comprising a housing adapted to receive the cassette removably, in a measuring device according to the preceding paragraph, the measuring circuit comprises a memorizing computer enabling each of the cassettes positioned successively in its housing to be identified, the recording for each positioning of the cassette of information representing the state of charge of the electret contained in this cassette and elaboration for each consecutive positioning of this cassette of information representing the discharge of the electret which has intervened since the preceding positioning, in a double shutter measuring device according to any one of the two preceding paragraphs, the double shutter is mounted overhung at the bottom of a fixed pocket of a readout apparatus so that its two plates, having respectively free edges with a bevelled or rounded profile, are adapted to guide the mounting of the cassette to its travelling read-out position, with a slight play, onto these plates, for which the electret is arranged between said plates whereas the two electrodes extend on the contrary along opposite surfaces of this plates, in a measuring device with a rotary shutter according to any one of the two preceding paragraphs which precede the previous one, the receiving device for the cassette is a box comprising the rotary shutter, its drive means, the measuring and display means and the electrical supply means, and a surface of the cassette enclosable in this box is channeled by a slot adapted to give access to the shaft of the rotary shutter, the measuring device is entirely contained in a pocket box, the box or cassette containing the electret chamber is fluid-tight.

The invention comprises, apart from these main features, certain other features which are preferably used at the same time and which will be more explicitly considered below.

In the following, preferred embodiments of the invention will be described with reference to the accompanying drawings given of course purely as non limiting examples.

BRIEF DESCRIPTION OF THE DRAWINGS

FIGS. 4 and 5 show diagrammatically in longitudinal sections two other modifications, with a double shutter, of measuring devices according to the invention.

DESCRIPTION OF PREFERRED EMBODIMENTS

Figure 1:
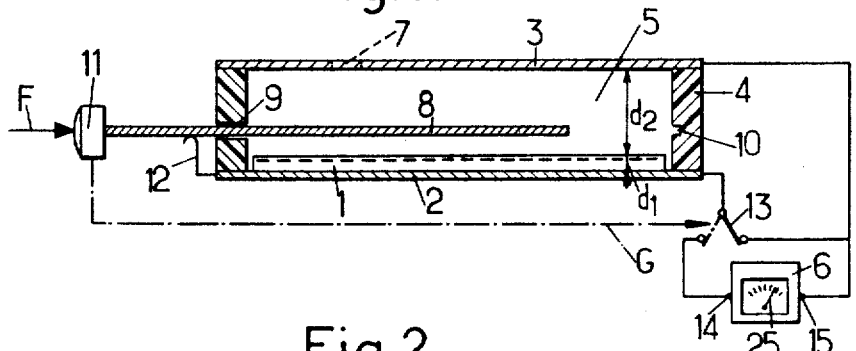
FIGS. 1 and 2, of these drawings, show diagrammatically in longitudinal sections two embodiments of measuring devices according to the invention.

In manner known in itself, the measuring devices comprises:

an electret 1, that is to say, a dielectric foil (constituted notably of a hydrogenated and fluorinated polymer) charged electrically in the vicinity of at least one of its surfaces as has been shown by the signs—by way of illustration, which charges concerned can be positive or negative, two conductive electrodes 2 and 3 framing this element 1 and constituted by two sheets or plates parallel to the latter and fastened to it, one of them, 2, being closer than the other of said electret and being notably in contact with this electret, of which it can constitute a simple metallisation, a separating part 4 of insulating material, notably in the form of a rectangular frame, adapted to hold the other electrode 3 at a certain distance from the electret so as to preserve a chamber 5 between this electrode and this electret, and a circuit 6 for exploiting for the purposes of measurement the modification in the electrical field produced between the electrodes 2 and 3 by the modifications in charge of the electret 1 due to the intervention of the parameter to be measured.

The whole is in fact arranged so that this parameter may exert its influence in the chamber 5 and thus modify the charge of the electret 1.

To this end one at least of the elements composing said chamber is provided as transparent or permeable to said parameter.

Thus, if this parameter is an ionizing radiation, the electrodes may be constituted of a light metal such as aluminium of an aluminium-base alloy, or again of a plastic material coated by metallisation with such a light metal, and areas of a more noble metal can then be provided on these electrodes at the level of their electrical connections with the circuit 6.

If the parameter concerned is a concentration of fluid or a temperature, openings such as those denoted by the reference 7 in FIG. 1 may be provided in one at least of the elements composing the chamber 5.

According to other modifications, one at least of these components may be constituted by a grid, a perforated plate, or a sintered body with sufficiently open porosity.

In manner known in itself, but for fixed laboratory installations, there is included with the above measuring device a conductive shutter and means for guiding and moving this shutter in the chamber 5, between the electret 1 and the electrode 3, parallel to this electret and to this electrode from a resting (or "stand-by") position to a measuring position and conversely.

In addition, there is provided according to the invention means for elaborating, on each movement of the shutter, bringing it into its measuring position, information representing a difference between two charges of the electret, which difference is linked with the measurement to be carried out and which will be further described below.

The shutter has been denoted by the reference 8 in FIG. 1 which will first be considered.

Its guide means may be constituted in any desirable way, for example, as illustrated, by a passage 9 crossing through one of the sides of the separating part 4 and by grooves 10 channeled in the inner surfaces of this part 4.

The displacement means of the shutter may also be constituted in any desirable manner: they are shown diagrammatically by the operating button 11 and the arrow F.

Although this button can be fastened to the shutter 8, it may be advantageous for certain applications to connect it to said shutter through a multiplying mechanism enabling the complete insertion of the shutter 8 into the chamber 5 to be actuated, as well as its subsequent disengagement, by means of movements of the button 11 of much smaller amplitude, which may be both rotations or translations.

The controls shown diagrammatically by the arrow F in FIG. 1, which relate both to the driving of the shutter 8 into the chamber 5 and to its movement out of this chamber, are generally effected manually if the assembly is portable.

But they may also be actuated automatically by motorized means, in particular on the hypothesis, described below, wherein the assembly is decomposed into two sub-assemblies, one portable adapted to collect the information to be measured and the other fixed, adapted to effect the measurement and to cooperate momentarily with the portable sub-assembly when the latter is in position on it.

The shutter 8 can occupy here:

a first position for which it is fully inserted into the chamber 5 and then completely hides the electret 1 from the electrode 3 in the transverse direction, that is to say perpendicular to these two elements, and a second position for which, on the contrary, it has totally emerged from the chamber 5, then rendering visible to the electrode 3, in said transverse direction, the whole of the charge surface of the electret 1.

One of these two positions may be considered as defining the "watching" state of the device, in the course of which the latter collects the information intended to be exploited for the measurement, and the other, as defining the "measuring" state proper.

In addition, the shutter 8 is here permanently connected to the electrode 2 by a conductive wire 12, and an electrical switch 13 operable automatically by the movements of the shutter 8 (as has been shown diagrammatically by the arrow G) enables:

either the electrical connection of the two electrodes 2 and 3 to one another to be made, as assumed in FIG. 1, when the device is in the "stand-by" state, or these two electrodes 2 and 3 to be electrically connected respectively, to the two terminals 14 and 15 of the exploitation circuit 6, preferably as soon as the movement of the shutter 8 has started to pass to the measuring state.

To avoid interfering electrical fields from falsifying the measurement, it is advantageous to protect the electrode 3 by an electrostatic shielding (not shown), constituted preferably by a conductive grid connected electrically to the electrode 2.

The operation of this measuring device is as follows.

When the shutter 8 is fully driven into the chamber 3, the electret charges are not "visible" from the electrode 3 and do not create any charge on the latter.

On the contrary, when the shutter is withdrawn, these charges become visible for the electrode 3 and immediately create close to this electrode an electrical field which induces on it a "image" charge q proportional to the surface density Y of said charges of the electret.

By this surface density $\sigma$, is meant here the "apparent" density for the electrode 3, that is to say the surface density proper of the charges of the electret, except if the charge surface of the latter is masked by ions attached to it and partially neutralizing its influence at a distance: in the latter case it is the overall density resulting at a distance from said surface density and masking ions which is taken into consideration and noted by $\sigma$.

If the distances between the charged surface of the electret are called $d_1$ and $d_2$ from the two electrodes 2 and 3 respectively, $\epsilon_1$ and $\epsilon_2$ the respective permittivities of the electret 1 and of the fluid filling the chamber 5, and S the surface area of the electret which is visible to the electrode 3, the charge-image q is equal at any moment to:

$$\sigma S \cdot \frac{d_1}{d_2} \cdot \frac{\epsilon_1}{\epsilon_2}$$

On each movement of the shutter 8 causing the latter to pass from stand-by position to its measuring position, the charge-image on the electrode 3 varies by the above amount q, either in the positive direction from 0 to q if this movement is a withdrawal, or in the negative direction from q to 0 if this movement is a further penetration.

The manifestation of the parameter to be measured in the chamber 5 gradually reduces the density $\sigma$, either because the actual charge of the electret diminished, or because ions created or circulating in the facing chamber 5 of the electret are drawn by the electrical field produced by this electret and consequently captured by the latter.

The charge-image variations (q or $-q$) which can be successively created on the electrode 3 by the movements of the shutter are then reduced in consequence and this reduction is all the more rapid as the value of the parameter to be measured is itself greater.

It it is desired to be content with measuring the gradual variations of the charge-image concerned, it would be necessary, especially when these variations are slow, to select for the input impedance of the measuring circuit 6 connected to the terminals of the capacitor formed by the two electrodes 2 and 3, an almost infinite value.

However such a choice would render the device sensitive to external electromagnetic fields as well as to the creation of interfering conductive paths and, to avoid this drawback, the input impedance concerned is given a finite value, although high: in such case the above capacitor discharges progressively in time through said impedance.

Consequently, if no zero reset is provided, the value of the charge-image departs progressively from the true image of the parameter to be measured and the device is no longer reliable.

This drawback is eliminated by the to-and-fro movements of the shutter 8, which movements comprise successively a complete introduction of the shutter into the chamber 5 followed by its complete disengagement from this chamber or conversely.

In fact, on such an operation, the device is completely renewed, the variation of the charge-image appearing immediately after this manoeuvre on the electrode 3 is exactly the image desired of the charge density $\sigma$ on the electret at the same moment and the measuring circuit 6 may be selected from among those utilising relatively fast variations of such a charge-image (from 0 to q or from q to 0).

This measuring circuit, which still has a relatively high input resistance, may include at its input, either a charge amplifier having a large capacity normalised to the input, or a voltage amplifier with a low input capacity.

To carry out the measurement of the desired parameter, it then suffices:

to proceed a first time with manipulating the above to-and-fro operation, accompanied by the read-out, at the first moment $t_1$ situated between the two displacements of this to-and-fro movement, of the value $q_1$ of the charge-image q at this moment, then to cause said parameter to act in the chamber 5, and finally to procede a second time with the above to-and-fro manoeuvre accompanied by the read-out, at a second moment $t_2$ situated between the two displacements of this to-and-fro motion, of the value $q_2$ of the charge-image q at this second moment.

The intensity of the parameter is proportional to the difference $q_2-q_1$ and may also be proportional to the time $t_2-t_1$.

The measuring circuit 6 includes means for elaborating information proportional to this difference of charges-images $q_2-q_1$, which difference is porportional to the difference of charge densities of the electret which these charges-images reflect and hence finally to the difference of the corresponding electret charges. This information is preferably displayed directly on a suitable dial in an analog or digital system.

In the case of analog display, a mechanical zero reset of the measuring device may be effected at time $t_1$ by moving a movable reading scale with respect to a reading needle, or again by displacing this needle itself.

In the case of digital display, it is possible to use an analog-digital converter, a memory adapted to store the information developed at the moment $t_1$ and a computer to automatically subtract this information from that of the same type developed at the moment $t_2$.

In each case, it is possible to associate the measurement with a recording, with an identification process and/or with a control adapted to trigger a warning system.

When the parameter to be detected is other than the temperature, it may be advantageous to be rid of variations in the charge-image q which are due to only thermal expansions of the separating part 4, which is translated by variation in the distance $d_2$ entering into the expression of the density $\sigma$.

According to a particularly original feature of the invention, this result is obtained by selecting to constitute said part 4, a material having the same coefficient of thermal expansion as the electret.

It is in fact observed that, in this case, the two distances $d_1$ and $d_2$ still vary with temperature, but not their ratio $d_1/d_2$ which alone enters into the expression concerned.

Herein lies a particularly interesting advantage of the invention since, failing the prevision of the improvement indicated, the thermal expansions alone would reduce the accuracy of measurement to $10^{-4}$ from the time when a variation in 10° C. would be tolerated in the measuring temperatures.

According to a modification, two electrodes 2 and 3 are connected permanently together and the electrode 2 and the shutter 8 are only connected together in the stand-by state of the device, said shutter being automatically connected, as soon as it passes to the measuring state, to the terminal 15 of the circuit 6. In this case the electrode 3 serves directly as an electrostatic sheild for the shutter 8 and the charge-images exploited for measuring purposes are those collected on this shutter 8.

In such a modification the principles of operation are substantially the same as those described above.

Of course, in the calculations, the distance $d_2$ between the charged layer of the electret 1 and the electrode 3 will be replaced by the distance between this charged layer and the shutter 8. In the same way, the portion of the separating part 4 which is conveniently constituted of a material having the some coefficient of thermal expansion as the electret is the portion, of this part, arranged transversely between the electrode 2 and the shutter 8.

According to a modification, the roles assigned respectively to the electrodes 2 and 3 in the embodiment of FIG. 1 are permuted, the electrode 3 then being connected electrically constantly to the shutter 8 and to the electrostatic shielding, if such is provided, and the charge-images exploited for measuring purposes on the to-and-fro movements of the shutter then being those which appear at the electrode 2.

Figure 2:
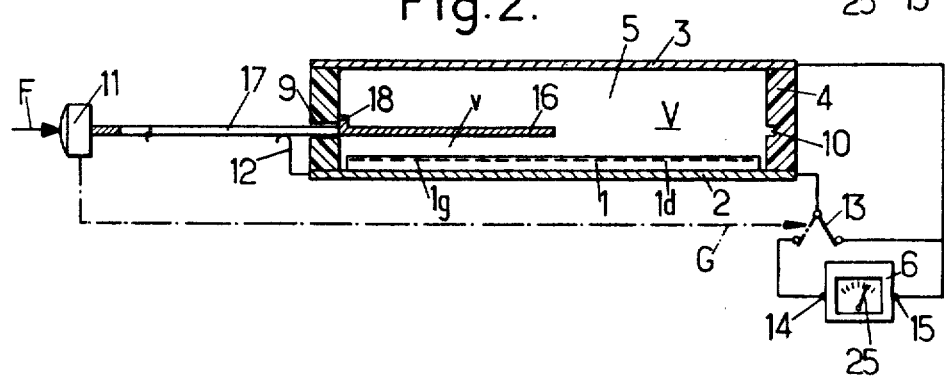

Referring to FIG. 2, another embodiment of the invention will now be described which is particularly interesting for certain applications, notably for those which require high accuracy of measurement and/or possibility of distinguishing the influences due to several distinct phenomena capable of progressively descharging the electret.

In this FIG. 2, identical elements with those previously described are noted by the same reference numerals as previously.

The main difference here resides in the fact that the surface of the movable shutter—here denoted by the reference 16—is smaller than that of the electret.

This shutter can hence mask transversally to the electrode 3 only an area of the electret 1, the complementary area of this electret then being exposed to said electrode, and the movements of the shutter enable said area and said complementary area to be permuted in their respectively exposed and non-exposed states.

In addition, it is arranged for the influence of the parameter to be measured not to be the same on the two areas concerned.

In the preferred embodiment illustrated, the surface of the shutter 16 is equal to half that of the electret.

The movements of this shutter hence enable two halves of the electret which become successively visible to the electrode 3, to be permuted.

In FIG. 2, the shutter 16 is in its most disengaged position, which position is determined by the thrust of a stop 18 of this shutter against the edge of the passage 9: said shutter then covers the left half $1_l$ of the electret 1 and disengages on the other hand its right half $1_r$, and it is the reverse for the furthest inserted position of the shutter, for which position it is a disengaged window 17 of the shutter which is arranged facing the left half $1_l$.

Under these conditions, if A and B are called the two extreme positions occupied by the shutter 16, namely respectively, A that illustrated by FIG. 2, and B the other position, the difference between charge-images q induced on the electrode 3 for these two positions A and B respectively is proportional to the difference between the charges borne respectively by the two halves $1_l$ and $1_r$ of the electret.

Now this difference does not depend on a possible degradation of the electret following, for example, prolonged storage of the latter at high temperature before placing in service, the charges of the two halves of this electret being identically affected by such a degradation.

In addition, and especially, said difference is nil when the parameter to be measured starts to act on the measuring device: in fact, the measurement no longer causes the charge q itself to be influential, but only the variations of the latter, which leads to much greater precision than previously.

The latter remark generally enables any zero resetting of the device at the first moment $t_1$, defined above, taking part in the measurement, to be avoided.

To arrange for the influence of the parameter to be measured to be different on the two areas of the electret, procedure may be in any way desired.

In this parameter is an ionizing radiation, this difference is obtained automatically through the simple fact of the differences which exist necessarily between the respective spaces available facing the two areas of the electret.

In fact, as indicated above, the ionizing radiation may, either act directly on the charges of the electret, or create ions in the space adjacent to this electret, said ions neutralizing said charges, but it is this second phenomenon which is generally the most important.

Now the number of ions formed in the space concerned depends on the thickness of the latter, it being all the higher as this thickness is itself greater.

Hence if the shutter 16 is much closer to the electret 1 than the electrode 3, the number of ions formed by a given external radiation in the space B arranged between the electret and this shutter 16 is much smaller than the number of ions formed by this same radiation in the volume V arranged between said electret and the electrode 3, and it is the same for the resulting discharge of the corresponding area of the electret (area $1_l$ when the shutter 16 is to the left in FIG. 2).

It is also possible to obtain or to reinforce the above differential effect in any desirable way, notably:

by constituting the two areas of the electret called upon to act successively on the electrode 3 by two different materials and/or charged differently at the start, by making the distances between the electret 1 and the electrode 3 different in the two parts of the chamber 5 taking part alternately in the measurement, by selecting different substances to constitute the media which respectively occupy the two successively useful parts of the chamber, these two parts being then isolatable from one another by an intermediate partition traversed in fluid-tight manner by the movable shutter.

Several of these formulae may also be adopted simultaneously.

For the embodiment of FIG. 2, just as for that of FIG. 1, the measurement again involves in principle two manipulations of the to-and-fro movement of the shutter 16 at two successive moments $t_1$ and $t_2$, each of these manoeuvres leading to the reading of the charge difference and the measurement of the desired parameter finally utilizes the variation of this charge difference between the moment $t_1$ and the moment $t_2$.

It would however be possible to pass from the first manoeuvre if one considers as moment $t_1$ a moment when the parameter to be measured does not still exert its influence on the device, the charge difference which would then be read being nil.

In a modification, one of the two electrodes or the shutter is divided into two portions extending respectively along the two areas $1_r$ and $1_l$ of the electret and the measurement information exploits the difference between the charge variations induced on each of the two said portions by the movement of the shutter 8: for the reasons explained previously, the variations in charge thus induced respectively on the two conductive portions concerned are images of the charges of the electret areas arranged opposite these two portions at the moment of said displacement.

In another modification, a device according to FIG. 1 is associated with a device according to FIG. 2 by decomposing the electrode 3 in three sections of which one extends over the whole length of the chamber 5 along the arrow F and of which the two others each extend parallel to the first, over only one half of this length, respectively covering a lateral strip of the half $1_l$ of the electret and a lateral strip of the half $1_r$ of the electret: by causing the first section to operate according to the principle of FIG. 1 and the two others according to the principle of FIG. 2, it is possible at the same time to profit from the advantages of the two formulas, namely accuracy (advantage according to FIG. 2) and certainty of operating with a sufficiently charged electret (advantage according to FIG. 1).

It will be noted that according to the principle of FIG. 1, the "difference" exploited according to the invention relates to the same electret area considered at two successive moments whereas, according to the principle of FIG. 2, this difference relates to two distinct electret areas considered at the same moment: this latter difference may itself suffice for the measurement or constitute itself only one of the two terms of a difference relating to two successive moments.

According to another modification, it is possible to associate with the above device according to one or other of FIG. 1 and 2, a warning device in accordance with the teachings of U.S. patent application Ser. No. 899.862filed by applicants Apr. 25, 1978 now U.S. Pat. No. 4,227,086.

It suffices for this purpose to provide for a portion of the electrode 2 to be mounted movably with respect to the rest of this electrode and to be urged by suitable means (spring, magnet . . . ) to be spaced from its normal resting position for which it is in extension of the rest of the electrode, and this against the electrostatic force of the electret: as soon as the charge of the latter becomes two weak, this portion moves and triggers a suitable warning.

It is to be noted that for each of the above-described embodiments, the electrical connections between on the one hand, the electrodes 2 and 3 and on the other hand, the terminals 14 and 15 of the circuit 6 (an electrode being replacable by the shutter 8) can only be effected at the moments of read-out $t_1$ and $t_2$.

Figure 3:
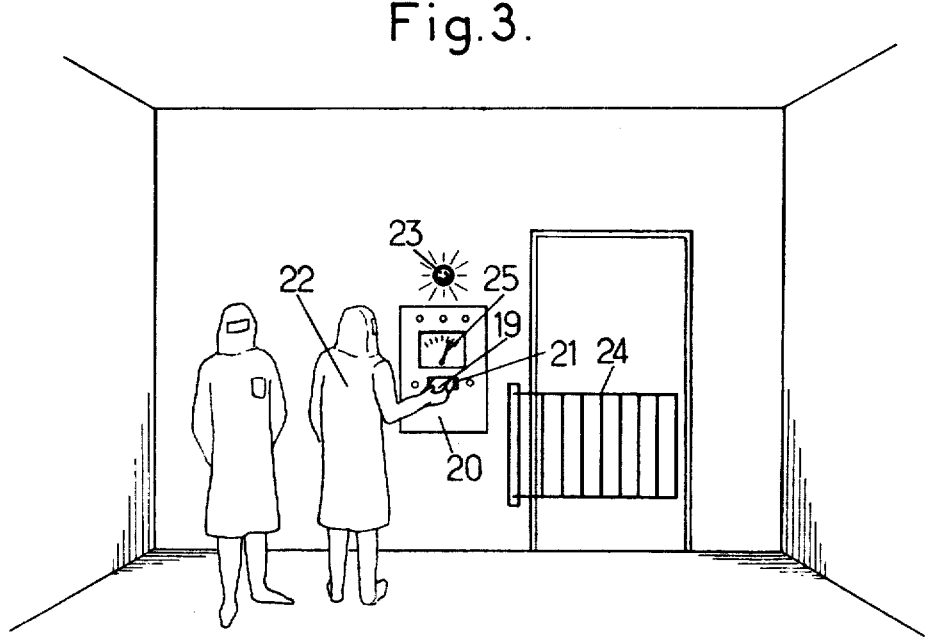
FIG. 3 is a perspective view illustrating one method of utilisation according to the invention of a modification of such a measuring device.

The invention hence lends itself particularly to the constitution of a remarkably simple and light portable detector comprising only, in a compact housing 19 (FIG. 3), chamber 5, that is to say the electret 1, the two electrodes 2 and 3, the spacing part 4, the possible shielding screens, and electrical connection means.

This detector is completed by a fixed device 20 comprising:

a housing 21 adapted to receive said box 19 in a well-determined position, the shutter 8 or 16, actuating means to cause this shutter to undergo the necessary to-and-fro movements, complementary means for establishing electrical connections removable with the ones, provided on the box 19, means for effecting the readings and measurements.

This device 20 is in addition advantageously associated with identification, memorizing, calculation, control and warning means.

Such an assembly lends itself particularly well to the surveyance of personnel working in an enclosure capable of being subjected to ionizing radiation.

To this end, the device 20 is placed in the vicinity of the entrance to said enclosure and a box 19 of the above type bearing identification symbols is allotted to each member 22 of the personnel concerned.

On entering the enclosure, each of these members introduces his box 19 into the housing 21 of the device 20 as into a ticket dating machine.

The device then records the identification of the wearer, the moment of the "dating"—which moment corresponds to that $t_1$ of the example given above and the first measurement of the charge q after having actuated the necessary shutter operation.

At the end of his stay in the enclosure to be monitored, the wearer 22 again introduces his box 19 into the housing 21 of the device 20 and the latter, after having actuated the further manoeuvre necessary of the corresponding shutter, displays directly at 25 the dose of radiation received by the wearer in the course of his stay in the above enclosure.

It is also possible to provide for this device to actuate the emission of a warning signal, such as the lighting of a signal lamp 23 and/or trigger the intervention of a safety system, such as the closing of a barrier 24, if the dose concerned exceeds a threshhold considered as dangerous and involving the intervention of a decontamination team.

In a modification, the shutter is borne by the box 19 instead of being borne by the fixed device 20 and the manipulating means for this shutter are again borne by this device.

It may be noted also that, in the latter case, one of the electrodes could be borne by the fixed device 20 instead of being borne by the box 19.

The electret 1, the fluid in contact with it and the electrodes may be constituted in any desirable manner, notably like one of those which have been described in U.S. patent application Ser. No. 899,862 filed by Applicants on Apr. 26, 1978 now U.S. Pat. No. 4,227,086.

In particular, it may be advantageous to constitute the electrode 2 by a thin aluminium layer applied by metallization on the electret 1 and the electrode 3 by an aluminium plate.

As for the shutter, it is constituted by a flat plate of a material conducting electricity such as notably aluminium or an insulating material covered with a thin aluminium layer on its two surfaces, and its thickness is generally comprised between 0.1 mm and 5 mm, being preferably of the order of 2 mm.

If necessary, sealing means could be provided in line with the passage 9 to prevent the entry of dust into the chamber 5 and/or the escape of fluid contained in this chamber, notably so as to keep the internal pressure of said chamber constant.

In the same way there would advantageously be provided means for cleaning the portions of the shutter external to the chamber before their introduction into the latter, for example, by causing them to pass between two rollers applied elastically against this shutter on each side of the latter.

The movements of the shutter may be more or less rapid, the duration of each of them being notably of the order of a second and more generally comprised between one tenth of a second and several tens of seconds.

The delay in read-out after passage of the shutter from its stand-by state to its reading state is generally of the order of some seconds.

With the above described constructions, the conductive shutter is simple and hence arranged on a single side of the electret when it is introduced into the chamber: it then masks this electret from the view of a single electrode.

With such a construction, it is necessary to cause one at least of the two electrodes to participate in each measurement and the distances between the electrodes and if necessary between the latter and the shutter must be determined with great exactness, which requirement sometimes presents certain difficulties of application.

To overcome this drawback, according to an advantageous embodiment of the invention, recourse is had to a double conducting shutter, that is to say comprising two parallel conductive plates $8_1$, $8_2$ (FIGS. 2 and 5) forming together the same conducting part and capable of straddling the electret, each of these two plates being provided to extend between said electret and one of the two electrodes.

As previously, the double shutter may occupy, with respect to the electret, two end positions for one of which it is totally disengaged from the gaps or chambers comprised between this electret and the electrodes, whereas on the other hand, for the other end position, it is fully inserted into these chambers, as illustrated in FIG. 4.

With such a construction, the moment of each measurement corresponds either to the positioning of the double shutter in the latter position of fully straddling the electret 1, which positioning is effected by driving the shutter 8 into the cassette 2, 3, 4 along the arrow F from its emerged position, or on the contrary in the reverse complete disengagement of the shutter out of the cassette from its fully inserted position.

The two electrodes 2 and 3 are advantageously continuously short-circuited, as shown diagrammatically by the lead 26, their common potential being applied constantly to one 15 of the two terminals of the circuit 6.

The shutter 8 is connected to this common potential during stand-by periods of the device in the course of which the charge of the electret diminishes gradually without being specially measured.

At the moments of measurement, said shutter 8 is on the other hand connected to the other terminal 14 of the circuit 6: the corresponding connection is ensured automatically by a switch 27 actuated notably by the starting of the insertion of the shutter into the cassette, which action is shown diagrammatically by the arrow H in FIG. 4.

It is to be noted at the moments when the double shutter 8 is fully inserted into the cassette 2, 3, 4, the electret 1 is surrounded practically entirely by this double shutter: the latter is hence influenced wholly by the charge of this electret and this, whatever the respective distances between the latter and each of the plates $8_1$, $8_2$.

This is an important advantage since it is no longer necessary to respect with great exactness the relative requirements for the respective positions (distance and parallelism) of the various components of the device, in particular when the measuring position of the shutter corresponds to the complete insertion of the latter into the cassette: a relatively wide tolerance may even then be allowed in the transverse play affecting the to-and-fro movement of the shutter in the cassette.

To benefit from the advantages indicated, it is convenient, of course, to select an electret of monopolar type so that the overall charge effect of this electret on the shutter which encompasses it is not nil.

It will be noted that, in the solution proposed, the measurement effected is also independent of possible migration of charges to the interior of the electret in the course of the life of the latter.

Numerous modifications of double shutter measuring devices applying the above explained principles may be envisaged.

One of these modifications will now be described with reference to FIG. 5.

This differs essentially from the preceding one by the following two characteristics:

in the first place, the double shutter is fixed instead of being movable, in the second place, each plate $8_1$ and $8_2$ of this shutter is covered externally, successively, by an insulating layer $9_1$, $9_2$ and a conductive layer $10_1$, $10_2$.

The fixed position of the shutter is selected permanently in a read-out device L equiped with a reading unit 28, for measurement and display (comprising the circuits 6 above with its display means 25), which device is adapted to receive itself, in a pocket 29, portable cassettes P reduced to their simplest form, that is to say each composed of the electret 1, of the two electrodes 2 and 3 and of their separating frame 4 as well as if necessary electrical connecting members.

The two plates $8_1$ and $8_2$ of the shutter are mounted overhung at the bottom of the pocket 29 and their edges or free sections 30 and 31 are bevelled or rounded so as to guide the insertions of the "reduced" cassettes P into this pocket 29, along the arrow K.

Other areas with a bevelled or rounded profile 32, 33 advantageously complete the "triple slot" bounding the outer aperture section of the pocket 29, said areas 32 and 33 being arrangable at the same transverse level as the edges 30 and 31 above, as seen in FIG. 2.

The assembly of the two outer conducting layers $10_1$ and $10_2$, forming an electrostatic shielding for the shutter, is connected permanently by a lead 34 at a common potential which may be that of ground, like that to which the two electrodes 2 and 3 of the various "reduced" portable cassettes are brought, whereas the two plates $8_1$ and $8_2$ comprising the double shutter are again connected by a lead 35 to the measuring device (comprised by the unit 28) for each measurement, that is to say preferably from the beginning of the insertion of each reduced cassette P into the pocket 29.

Of course, a retractable shutter may be provided to close the front surface of the cassette P (considered in the direction of the arrow K) outside of the moments when this cassette is inserted in the pocket 29 of the read-out device L, which shutter is closable in completely sealed manner.

In the same way, any desirable means may be provided to enable the identification of this cassette P on the above-said insertions as well as the memorization, in the unit 28, of the data relating to this identification and to the charge then measured of its electret.

It is to be noted that this modification does not resort to any electrical contact with sliding or more generally movable, elements on the positioning of the reduced cassettes P in the reading device L.

It is also to be noted that the transverse play existing between the three slots of the pocket 29 and the tongues 1, 2, 3 that they receive may be relatively high, the width of each slot being for example 0.5 mm greater than the thickness of the tongue to be received.

In the above-described embodiments, the movements of the shutters are generally ensured manually at the initiative of the wearers of these devices.

If the variations in the parameter to be measured, instead of being predictable, regular and slow, are unpredictable, irregular and/or rapid, it is convenient to exert in their regard, a permanent or at least more diligent surveyance.

To be able to ensure such surveyance without however compromising the portable nature of the measuring devices concerned, according to advantageous embodiments of the invention, the shutter 8 (FIGS. 6 and 7) is made rotatable on the shaft 36 and instead of being manually moved, it is rotated constantly by means of an electric motor 37 which is particularly light and consumes little electrical energy.

This constant drive is always ensured in the same direction so that each revolution of the shutter ensures at least one complete cycle of the sequence of maskings and eliminations of masking that this shutter is intended to ensure alternately between the electret 1 and the electrode 3.

The drive concerned of the shutter is effected continuously or intermittently so that the complete cycle concerned is effected in a relatively brief time, preferably less than ten seconds.

The assembly may be provided so that at each revolution of the shutter a single complete cycle of the type indicated corresponds.

In this case, the shutter 8 has the form of a semi-circle taking as an axis that of the shaft 36 and it is the same for the electrode 3: the integral masking of the latter from the view of the electret is then ensured when the shutter occupies, with respect to the above axis, the same angular position as said electrode.

However it is preferred to multiply the number of complete cycles carried out for each revolution of the shutter by a factor n greater than 1.

This shutter then comprises a sequence of n identical circular sectors each extending over an arc of 180°/n and displaced from one another by angles equal to 180°/n and it is the same for the electrode 3.

Figure 6:
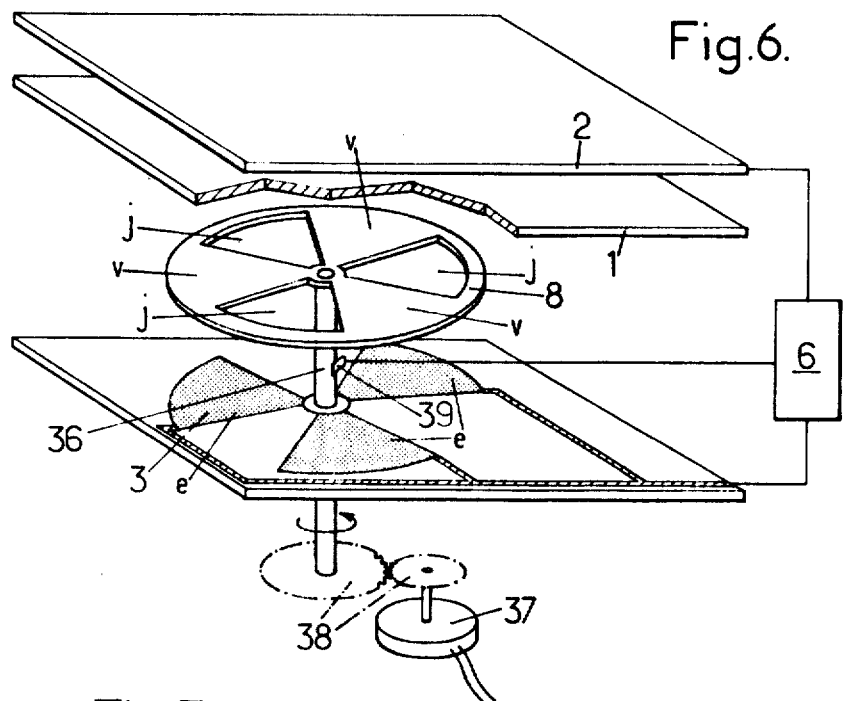
FIGS. 6 and 7 show diagrammatically also in perspective two other modifications, with a rotary shutter, of measuring devices according to the invention.

In the preferred embodiment which has been shown diagrammatically in FIG. 6, the number n is equal to 3: the shutter 8 then comprises three circular sectors v of 60° aperture mutually displaced by 60° and the electrode 3 is also composed of three circular sectors e each having also an aperture of 60° and displaced mutually by 60°.

The intervals j comprised angularly between the various sectors v of the shutter may be fully open, as shown, or on the other hand occupied by a material which is transparent to the electrical field.

The number n may be different from 3, being for example equal to 2 or to 4, but it is preferred that it should not exceed 4 to avoid leakages and edge effects which are all the more numerous as said number n is itself higher.

The motor 37 may be of any desirable type, of low weight, and of low electrical consumption.

It may be envisaged to provide a continuous drive of the shutter 8.

However, according to an interesting modification, it is constituted by a pulsed stepping motor such as currently used in the field of watch movements.

Each of the pulses concerned is sufficiently long for the drive, of the shaft of the motor, which results therefrom, to enable this shaft to be impelled from one of its stable positions to its following stable position and sufficiently short for the corresponding electrical power to be low: these pulses have for example a duration of the order of 10 ms and are emitted at a frequency of the order of 10 Hz.

The drawback of such a motor being that it ensures a relatively low drive torque, there is inserted between the latter and the shaft 36 a gear-wheel reducing mechanism 38.

By way of purely illustrative example, it is indicated that, if the ratio of this reducing mechanism is 10 and if each revolution of the shaft of the motor requires the emission of six pulses, it will be necessary in the case where the pulses are emitted at the frequency indicated above of 10 Hz, for a period of 6 seconds to pass for the shutter 8 to execute a complete revolution.

In the case preferred where the number n is equal to 3, the complete masking cycle of the electret and of the suppression of this masking is hence ensured in 2 seconds.

The electric connection between the rotary shutter 8 and the measuring circuit 6 is ensured by means of a conductive tongue 39 applied elastically against the shaft 36.

The operation of the device is similar to that which has been described above, with the following slight difference:

in the preceding embodiments, only the intentional manoeuvres of the shutter by the user enabled, either a fresh or "renewed" charge induced by the electret 1 due to of the disengagement of the shutter 8 to appear on the measuring electrode, or such a charge to be made to disappear due to the insertion of this shutter between the electret and said electrode, which manipulations were spaced in time by considerable periods which frequently reached or exceeded one hour, in the present case, said appearances and disappearances of fresh charges succeed each other cyclically and automatically at a relatively fast rhythm which is once every 2 seconds in the numerical example given above.

The measuring circuit 6 comprises comparison means, zero reset means or the like enabling the latter to develop constantly a data D relative to the difference between the value of charge of the electret as measured on each cycle above and the value of this corresponding charge at a given initial moment.

In the preferred case where the parameter to be measured is the ionizing radiation emitted in an enclosure to be monitored from the point of view of radioactivity, this initial moment is that corresponding to the entry of the bearer of the measuring device into said enclosure.

Said circuit 6 comprises in addition preferably means adapted to display said data D and, again preferably, other means for energizing a warning, notably visual or audible, as soon as the value of the data D exceeds a predetermined threshold.

Means may also be provided to ensure the respective detection of passage through successive threshholds by the value of the data D, with for example, emission of flashes whose frequency would be all the higher as this value is itself higher.

The electronic system adopted to constitute the measuring circuit 6, which resorts preferably to components of the C-MOS type with low electrical consumption, comprises generally an input amplifier adapted to receive the charge to be measured, it being to this end notably connected to the electrode 3 in the case of FIG. 1.

This amplifier must be closed and reset to zero after each measurement and its reopening must then only take place at the beginning of the subsequent measuring phase: this beginning corresponds, in the case of FIG. 6, to the moment when the shuter 8 commences to unmask the electrode 3.

To avoid any drift between this moment of reopeneing of the input amplifier and the actual start of unmasking or the like indicated, there is advantageously provided means for detecting cyclically the actual angular position of the shutter or more precisely the moment of each cycle which corresponds to the actual start indicated.

This means may be of any desirable nature, notably:

of a capacitative type and then sensitive, for example, to the variations of a capacity connected to the rotation of the shutter, this capacity being itself constitutable by the two electrodes 2 and 3 themselves, said capacity passing through a maximum each time that the angular positions of the openings j correspond to those of the sectors of the electrode 3, of an optical type and then exploiting a light ray which, either traverses a hole of small section pierced in the shutter, or is reflected by a reflecting area of small surface area provided on this shutter.

In the case indicated where a light ray is resorted to, it is advantageous, to reduce the electrical consumption of the source of this ray, to adopt for the latter a pulsed mode of operation at a sufficiently high frequency.

If the motor 37 is of a stepping type, for which each actuating pulse ensures the driving of the rotor from one stable angular position to a following stable angular position, it is convenient to provide damping means to prevent the overshooting of this following stable angular position by said rotor as well as possible angular oscillations of this rotor around this latter position.

Figure 8:
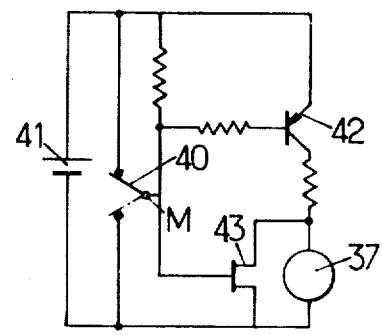
FIG. 8 shows diagrammatically a control circuit for the drive motor of the shutter included in such a measuring device.

To this end, a circuit in accordance with the diagram of FIG. 8 is advantageously resorted to, for which the winding of the motor 37 is automatically short-circuited on itself after each actuating pulse.

In this circuit, the train of pulses, applied at a point M is symbolized by a switch 40 connected normally to the positive pole of a direct current source 41 and momentarily to its negative pole, on the creation of the pulses.

The circuit concerned comprises a supply transistor 42 for the motor 37 connected in series with the latter and a transistor 43 of the V-MOS type connected in parallel with said motor: the creation of each pulse has the effect of making the transistor 42 conducting and blocking the transistor 43 whereas on the contrary, at the end of each pulse, the transistor 42 is blocked and the transistor 43 is made conducting, which ensures the desired short-circuit automatically.

When the discharge of the electret 1—on which the measurements are here based—becomes too great, and the residual charge of the electret has become too small, this electret is worn and it should be replaced.

Figure 7:
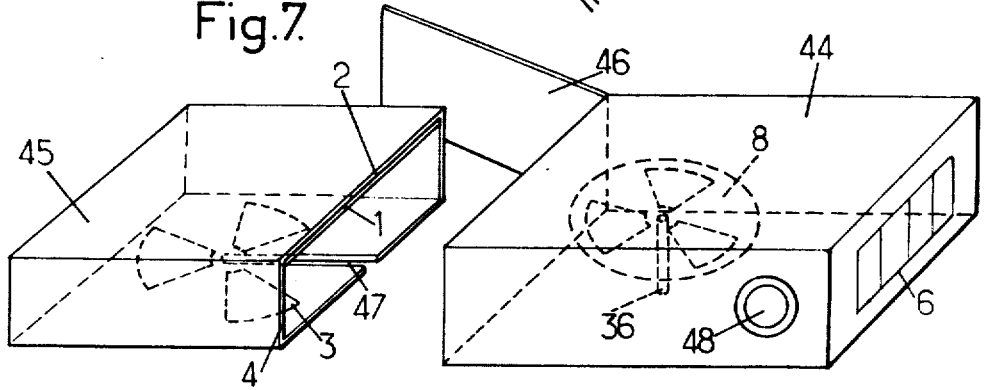

The modification of the embodiment shown diagrammatically on FIG. 7 makes such replacements possible and simple, taking into account the two following considerations:

the respective distances between the two electrodes 2 and 3 and between electret 1 and these electrodes must be strictly respected, it is convenient to preserve for the processing of the several successive electrets for the measuring purposes above, the assembly of the rotary shutter 8, of its drive motor 37, of its reducing gear 38, of the actuating means for the motor, of the measuring and display means, and of the electrical supply means of the different circuits.

According to this modification, the assembly of means concerned is grouped in the same housing 44 while the electret is placed in an independent cassette 45 containing with it, only, the two electrodes 2 and 3 and the separating part 4.

The housing 44 and the cassette 45 are each advantageously in the general shape of a flat rectangular parallelepipede, the cassette being a little smaller than the housing and dimensioned so as to be insertable in the latter, through one of its small faces which can be closed by a rotary flap 46.

One of the walls of the cassette 45 is channelled with a rectilinear slot 47 adapted to receive the shaft 36 on the insertion indicated, said slot extending from the free section of said wall up to the heart of the star formed by the constituent sectors of the electrode 3, as can be clearly seen in FIG. 7.

The assembly of the housing equipped with its cassette forms a self-contained whole which may be used as such independently of any other device.

Its exploitation can also be contemplated within the field of a more complete surveillance such as that of an area or enclosure capable of being contaminated radioactively or subject to ionizing radiations.

Such surveillance brings into action control of entry and exit from the area by the placing of the box 44 in suitable readers: in the course of each of these emplacements, the identification of the box, that if necessary of its bearer (previously recorded, for example, on an independent magnetic card), as well as the value of the charge of the corresponding electret 1 are read and memorized in the reader concerned in order notably to establish the history of each bearer from the point of view of overall doses of radiations received by him during given periods.

The area 48 visible on the box 44 of FIG. 7 symbolizes the transfer of data produced in this way from the box to such a reader, said transfer being ensured here by a capacitative linkage: said area 48 may in fact constitute an electrode of a capacitor whose other electrode is constituted by an area, of each fixed reader, which is automatically placed parallel to the first and at a short distance from the latter when said box is positioned in said reader.

The transfer of data concerned could of course be carried out in any other desirable manner, for example, by magnetic induction or even by means of mechanically formed electrical connexions.

Safety means may be provided to prohibit any uncontrolled disengagement of the cassette 45 from the box 44, or again any reintroduction of this cassette into this box after its uncontrolled disengagement from the latter.

The rotary shutter 8, instead of being single, as in the constructions described with reference to FIGS. 6 and 7, could be doubled as in the constructions of FIGS. 4 and 5 and adapted to envelope the electret cyclically thereby masking it then at the same time with respect to the two electrodes.

The measuring devices described above have numerous advantages with respect to those previously known, notably as regards the accuracy, the reliability and sensitivity of the measurement, (the latter being understood both as regards X-rays and gamma rays or neutrons), the simplicity of the manufacture and the employment, the low cost of production and of exploitation and the portable nature. As is self evident and as emerges already from the foregoing, the invention is in no way limited to those of its methods of application and embodiments which have been more especially contemplated; it encompasses, on the contrary, all modifications.

We claim:

1. Device for measuring a parameter capable of modifying the electrical charge borne by an electret, comprising, in addition to such an electret, two conductive electrodes framing this electret parallel to the latter, a separating part keeping one at least of these electrodes at a certain distance from the electret so as to preserve a chamber between them, means for enabling the parameter to be measured to exercise its influence in this chamber by modifying the charge of the electret, an electrical circuit for measuring the modifications of the electrical field produced in the chamber, a conductive shutter and means for moving this shutter within the chamber parallel to itself and to the electrodes from a standby position to a measuring position and conversely, said device comprising in addition means for developing, on each movement of the shutter bringing it into its measuring position, information representing a difference between two electret charges, which difference is linked with the measurement to be carried out.

2. Measuring device according to claim 1, wherein the difference of electret charges is the discharge undergone by the electret from a preceding moment corresponding notably to a prior identical movement of the shutter.

3. Measuring device according to claim 2, wherein the difference of electret charge is that observed at the moment of measurement between the charges of two distinct areas, of the electret, arranged so as to be influenced differently by the parameter to be measured.

4. Measuring device according to claim 1, wherein the difference of charge of the electret is that observed at the moment of measurement between the charges of two distinct areas, of the electret, arranged so as to be influenced differently by the parameter to be measured.

5. Measuring device according to claim 4, wherein the surface area of the shutter is less than that of the electret, and the displacement means enable it to be moved transversally opposite, successively, complementary areas of this electret.

6. Measuring device according to claim 5 wherein the surface area of the shutter is of the order of one half of that of the electret.

7. Device according to claim 3, wherein one of the two electrodes or the shutter is divided into two portions extending respectively along two areas of the electret and wherein the measuring information exploits the difference between the variations in charge induced on each of the two said portions by the movement of the shutter.

8. Measuring device according to claim 1, wherein the separating part is constituted of a material having the same coefficient of thermal expansion as the electret.

9. Measuring device according to claim 1, wherein said device comprises in addition an electrical switch actuated automatically by the movements of the shutter and adapted to control the standby and measurement connections.

10. Measuring device according to claim 1, wherein the shutter and the electrodes are constituted by plates or coatings of aluminium.

11. Measuring device according to claim 1, wherein the conductive shutter is double, and comprises two parallel conductive plates adapted to straddle the electret for one of the end positions of the shutter, each of these plates extending then between the electret and the electrode.

12. Measuring device according to claim 11, wherein the two plates of the double shutter are covered externally by insulating layers, themselves covered externally by conductive layers connected to the common potential of the two electrodes.

13. Measuring device according to claim 11, wherein its components are borne by two separate assemblies, the the electret, the two electrodes and the separating part, being borne by a portable cassette, and, the measuring circuit, preferably the shutter, being borne by an apparatus, comprising a housing adapted to receive the cassette removably, and wherein the double shutter is mounted overhung at the bottom of a fixed pocket of a readout device so that its two plates, having respectively three edges with a bevelled or rounded profile, are adapted to guide the assembly of the cassette into its straddle read-out position, with a slight play, on these plates, for which the electret is arranged between said plates whereas the two electrodes extend on the other hand along the outer surfaces of these plates.

14. Measuring device according to claim 11, wherein the measuring circuit comprises a memorizing computer enabling each of the cassettes positioned successively in its housing, to be identified, information for each positioning of a cassette representing the state of charge of the electret contained in this cassette to be recorded and the development, for each consecutive placing in position of this cassette, of information representing discharge of the electret which has taken place since the preceding positioning, and wherein the double shutter is mounted in cantilever style at the bottom of the fixed pocket of a read-out apparatus so that its two plates having respectively free edges with a bevelled or rounded profile, are adapted to guide the mounting of the cassette into its straddled read-out position, with a slight play, on these plates, for which the electret is arranged between said plates whilst the two electrodes extend on the other hand along the outer surfaces of these plates.

15. Measuring device according to claim 1, wherein the conductive shutter is of a rotary type and divided in 2n identical circular sectors each extending over an angle of 180°/n around the axis of the shutter, n being a whole number at least equal to 1 and preferably less than 4, which sectors are alternately opaque and transparent with respect to the electrical field, wherein the electrode arranged on the same side of the electret as the shutter is itself composed of n circular sectors identical with the preceding ones, displaced angularly from one another by 180°/n around the axis of the shutter, and wherein a light and low energy-consuming electric motor is provided to drive said shutter continually in rotation during measurements so that, in the course of each of its revolutions, this shutter ensures at least one complete cycle of the sequence of maskings and mask removals which it has to ensure alternately between the electret and the electrode above.

16. Measuring device according to claim 15, wherein the motor is a pulsed stepping motor of the type known in the field of clockwork and is associated with a reducing mechanism, notably with gearing.

17. Measuring device according to claim 16, comprising means for developing, on each revolution of the shutter, at least one information relating to the actual angular position of this shutter with respect to the electret and for exploiting this information in the measuring circuit for synchronisation purposes.

18. Measuring device according to claim 15, comprising means for developing, on each revolution of the shutter, at least one information relating to the actual angular position of this shutter with respect to the electret and to exploit this information in the measuring circuit for synchronisation purposes.

19. Measuring device according to claim 15, comprising means for constantly producing information relating to the total discharge undergone by the electret from a given initial moment.

20. Measuring device according to claim 15, comprising means for triggering a warning when the total discharge undergone by the electret exceeds a predetermined threshold.

21. Measuring device according to claim 15, comprising means for constantly producing information relating to the total discharge undergone by the electret from a given initial moment and for triggering a warning as soon as the value of said information exceeds a predetermined threshold.

22. Measuring device according to claims 20 or 21, wherein said warning is a flashing visual signal.

23. Measuring device according to claim 15, wherein its components are borne by two distinct assemblies, the electret, the two electrodes, and the separating part, being borne by a portable cassette, and the measuring circuit and preferably the shutter, being borne by an apparatus, comprising a housing adapted to receive the cassette removably, and wherein the apparatus for receiving the cassette is a box including the rotary shutter, its drive means, the measuring and display means and the electrical supply means and wherein one surface of the cassette, housable in this box, is channeled by a slot adapted to free access for the shaft of the rotary shutter.

24. Measuring device according to claim 15, wherein the measuring circuit comprises a memorizing computer enabling each of the cassettes successively positioned in its housing, to be identified, information for each positioning of a cassette representing the state of charge of the electret contained in this cassette to be recorded and to develop for each consecutive placing in position of this cassette, information representing the discharge of the electret which has taken place since the preceding positioning, and wherein the receiving apparatus of the cassette is a box including the rotary shutter, its drive means, the measuring and display means and the electrical supply means and wherein one surface of the cassette is channeled by a slot adapted to free access for the shaft of the rotary shutter.

25. Measuring device according to claim 1, wherein its components are borne by two distinct assemblies, the electret, the two electrodes, and the separating part, being borne by a portable cassette, and, the measuring circuit and preferably the shutter, being borne by an apparatus comprising a housing adapted to receive the cassette removably.

26. Measuring device according to claim 25, wherein the measuring circuit comprises a memorizing computer enabling each of the cassettes successively positioned in its housing, to be identified, information for each positioning of a cassette representing the state of charge of the electret contained in this cassette to be recorded and the development, for each consecutive placing in position of this cassette, of information representing the discharge of the electret which has taken place since the preceding positioning.

27. Measuring device according to claim 1, contained entirely within a pocket container.

28. Measuring device according to claim 1, wherein the container or cassette containing the electret chamber is fluidtight.

* * * * *